United States Patent [19]

Arrendiell et al.

[11] Patent Number: 5,363,538

[45] Date of Patent: * Nov. 15, 1994

[54] CORD CLASP

[76] Inventors: Robert W. Arrendiell; Gwendolyn G. Ellis, both of 280 Sugarberry Cir., Houston, Tex. 77024

[ * ] Notice: The portion of the term of this patent subsequent to Oct. 13, 2009 has been disclaimed.

[21] Appl. No.: 957,685

[22] Filed: Oct. 7, 1992

Related U.S. Application Data

[63] Continuation-in-part of Ser. No. 821,975, Jan. 16, 1992, Pat. No. 5,153,969.

[51] Int. Cl.$^5$ .............................................. A44B 21/00
[52] U.S. Cl. ........................................ 24/499; 24/507; 24/508
[58] Field of Search .................. 24/499, 501, 508, 507, 24/511, 500, 509, 510, 535, 16 R

[56] References Cited

U.S. PATENT DOCUMENTS

| | | | |
|---|---|---|---|
| 363,533 | 5/1887 | Munger | 24/511 |
| 537,955 | 4/1895 | Adams | 24/499 |
| 1,357,151 | 10/1920 | Dalhaus | 24/507 |
| 1,464,374 | 8/1923 | Vestine | 24/511 |
| 1,474,102 | 11/1923 | Ashmore | 24/511 |
| 1,844,774 | 2/1932 | Locki | 24/507 |
| 1,891,494 | 12/1932 | Baltzley | 24/501 |
| 3,091,828 | 6/1963 | Soltis | 24/507 |
| 3,111,129 | 11/1963 | Dekel | 24/499 |
| 3,597,813 | 8/1971 | Takahashi | 24/499 |
| 3,999,259 | 12/1976 | Paajanen | 24/508 |
| 4,175,306 | 11/1979 | Bigelow et al. | 24/507 |
| 4,742,429 | 5/1988 | Arrendiell et al. | 361/391 |
| 4,839,947 | 6/1989 | Cohen et al. | 24/499 |
| 5,052,086 | 10/1991 | Nasuno | 24/511 |
| 5,079,808 | 1/1992 | Brown | 24/511 |

FOREIGN PATENT DOCUMENTS

| | | | |
|---|---|---|---|
| 0056040 | 4/1939 | Denmark | 24/508 |
| 0034603 | 10/1965 | Finland | 24/508 |
| 0016600 | 2/1913 | France | 24/499 |
| 0009305 | of 1898 | United Kingdom | 24/508 |

Primary Examiner—Victor N. Sakran
Attorney, Agent, or Firm—Vaden, Eickenroht, Thompson, Boulware & Feather

[57] ABSTRACT

A cord clasp is disclosed for holding together several loops or folds of an appliance cord in order to keep the cord tidy. The clasp includes two complementary facing jaw members, each having a cord surrounding portion and a handle portion separated by a pivoting ridge. A bias means keeps the jaws or cord surrounding portions together. The jaw members are farther apart at the handle portions than at the closure point of the cord surrounding portions. The jaw members are quite wide and have complementary shaped front edges. The shape of the clasp enables the cords to be grasped or held securely when only a small number of cord loops are gathered or when a large number of cord loops are gathered. The cords will also be held even if the cord surrounding portions do not come completely together. Also disclosed is a molding process for a preferred embodiment wherein a mold for a handle segment can be employed with a selected mold for a jaw-member segment to permit the handle mold to be adapted for use with jaw-member segment molds of varying lengths.

14 Claims, 3 Drawing Sheets

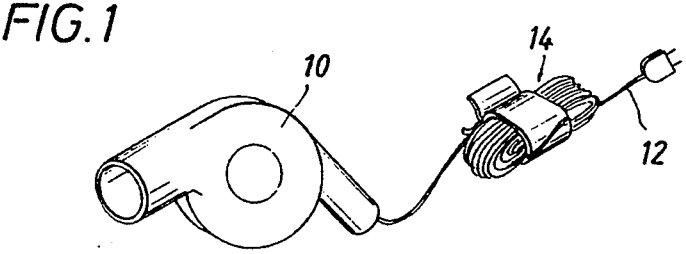
FIG. 1
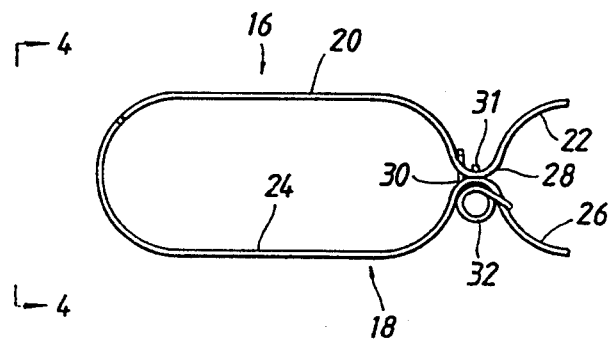
FIG. 2
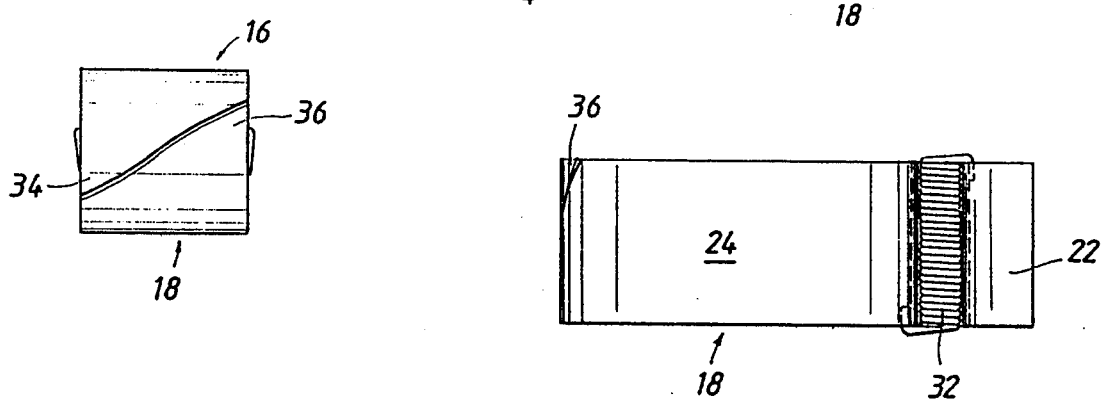
FIG. 4
FIG. 3
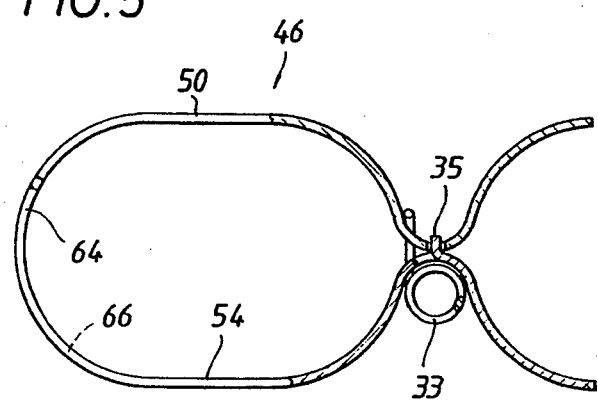
FIG. 5
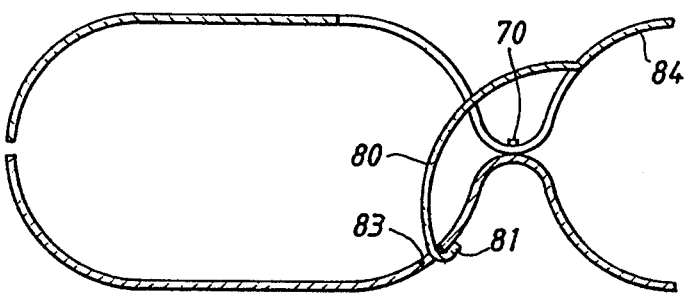
FIG. 6

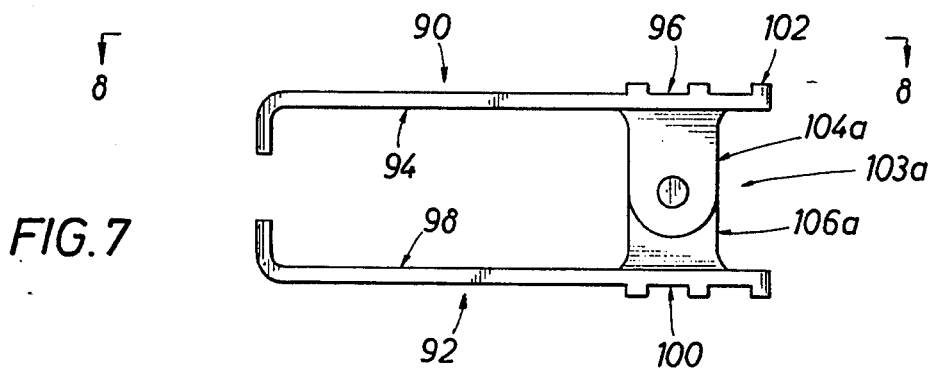
FIG. 7
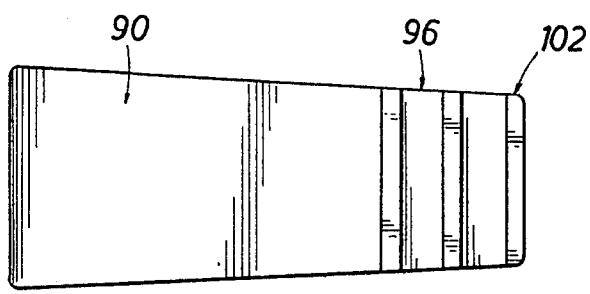
FIG. 8
FIG. 9
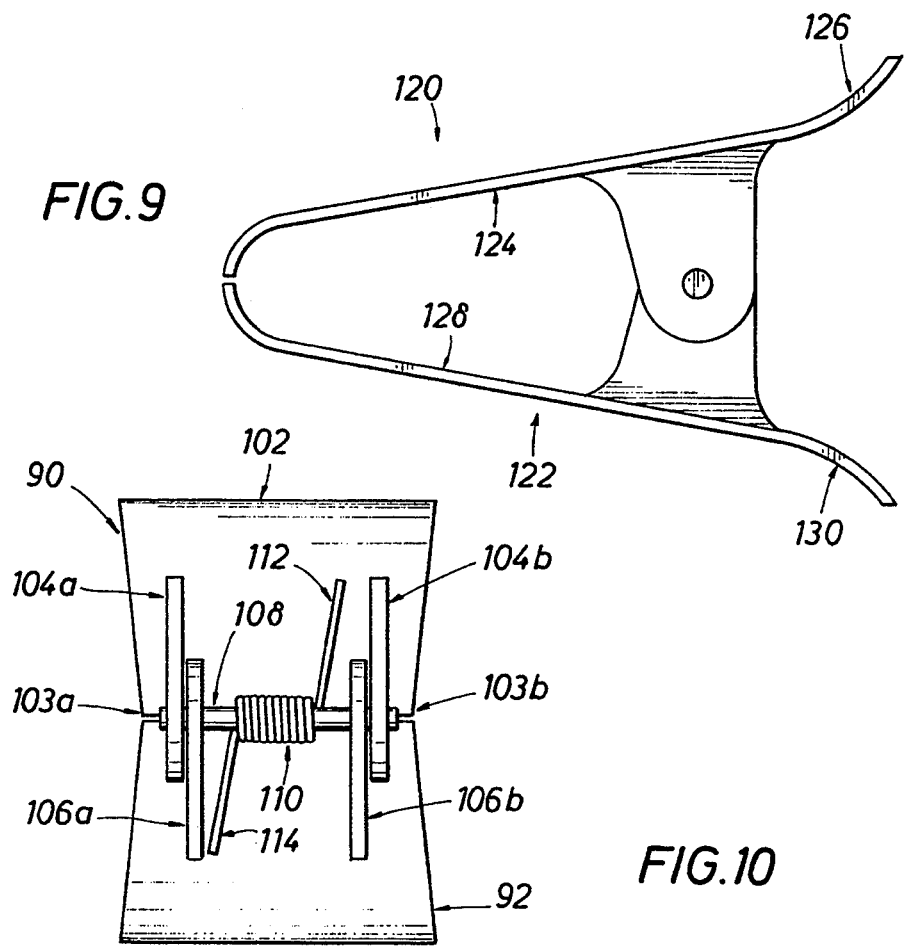
FIG. 10

CORD CLASP

This application is a continuation-in-part of application Ser. No. 07/821,975, filed Jan. 16, 1992 now U.S. Pat. No. 5,153,969.

BACKGROUND OF THE INVENTION

1. Field of the Invention

This invention pertains to apparatus for holding and containing gathered cord and more specifically to apparatus suitable for tidying otherwise unsightly appliance cords.

2. Description of the Prior Art

It is not uncommon for numerous electrical appliances to be left in the open on countertops in such rooms as kitchens and bathrooms and in such work areas as home shop work benches. Electrical cords can be snugged up to outlets in some cases and become somewhat tidy. In other instances, cords can be tacked neatly to the floor or wall when the appliance base is located some distance from the plug, provided the base is left permanently located in a single place of use.

However, there are many times when neither of the above conditions exist. For example, a hair dryer does not remain on the counter in one location, but is most conveniently picked up for use and placed down when not in use. In order to be put in a condition that is somewhat sightly when not in use, hair dryers are often unplugged all together and put away in a drawer. However, a hair dryer or similar appliance that is put away must be set up again before it can be used in spite of the fact that it is intended to be left plugged in ready for use and merely turned off by its on/off switch.

U.S. Pat. No. 4,742,429, commonly owned, describes a bathroom electrical appliance caddy that accommodates electrical appliances in a cabinet-mounted housing that can be readily slid out of the cabinet when one or more appliances carried therein is ready for use and put away when not in use. However, appliances with long and/or ungainly cords located on one or both shelves of such a caddy are often left in an unsightly condition. The cords are just tossed back onto the housing shelves of the housing before the housing is slid back into the cabinet. Loose cords can subsequently tangle or knock off items from their shelves when subsequently pulled out.

In some installations, cords are purposely curled or retracted. For example, it is common for the handset of a telephone to be connected to its base by a curled cord that tightly winds up when the handset is returned to its cradle. However, most appliances do not come with such curled cords and it is not convenient to replace cords that come with most appliances with such self-policing cords.

Cords have been tidied in the past in many ways by persons not pleased with either the unsightly appearance of such cords or perhaps because unsightly cords can become tangled and therefore potentially hazardous. Tangled cords, for example, that are assumed not to be tangled when tugged can drag undesired items with them. To keep this from happening, long cords have been tied in knots by their users or twist ties have been used to join gathered loops of cords together. Some appliances come with cylindrical clamps that encircle a gathered cord mass to semi-permanently clamp a predetermined number of loops together to foreshorten the cord. None of these methods are particularly useful for gathering and holding cords together in a temporary gather that can be quickly and conveniently subsequently released to allow gathering again in a different manner, for instance with more or less cord loops.

Therefore, it is a feature of the present invention to provide an improved apparatus that can be employed with loosely gathered appliance cords or the like to make them more tidy than they otherwise would be.

It is another feature of the present invention to provide an improved cord clasp that is of little trouble to manipulate and readjust and can be used with almost any appliance cord in common use.

SUMMARY OF THE INVENTION

The apparatus in a preferred embodiment of the present invention includes two substantially identical jaw members pivoted together along a ridge between their respective cord surrounding portions and their handle portions. A spring or other bias means urges the two cord surrounding portions together. The cord surrounding portions are preferably curvilinear and the tips of their front edges curve more than the remainder of their surfaces. The tips are gently rounded and are located at one side of their respective front edges. In another preferred embodiment, the jaw members are pivoted together by two hinges having a spring between the hinges for urging the cord surrounding portions together. The jaw members have handle portions having a plurality of ridges for gripping the handles. Alternatively, the jaw members may have outwardly curved handle portions. The handle portions are farther apart than are the cord surrounding portions when the clasp is closed. The jaw members taper from a wider profile at the handle portions to a narrower profile at the tips of the cord surrounding portions. The two cord surrounding portions come together in complementary fashion and at least loosely retain the gathered cord with which they are employed within their grasp even when the thickness of the cords do not allow the surrounding portions to close completely. Squeezing the handle portions together opens the cord surrounding portions to allow the cord to be released or repositioned.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary embodiments thereof which are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings:

FIG. 1 is a pictorial view of a typical appliance having a cord tidied by a cord clasp in accordance with a preferred embodiment of the present invention.

FIG. 2 is an oblique side view of a first preferred embodiment of the cord clasp in accordance with the present invention wherein the jaw members thereof have a long, low profile.

FIG. 3 is a bottom view of the embodiment shown in FIG. 2 showing the dimensional relationships of the jaw members.

FIG. 4 is an end view of the embodiment shown in FIG. 2.

FIG. 5 is an oblique side view of a second preferred embodiment of the present invention wherein the jaw members thereof have a more circular profile than the first embodiment for rolling the cord loops together as the clasp is closed.

FIG. 6 is a side view of a third preferred embodiment of the present invention wherein the bias means urging closure is from a portion of one of the jaw members.

FIG. 7 is a side view of a fourth preferred embodiment of the present invention wherein the handle portions have a plurality of ridges for gripping the handles.

FIG. 8 is a top view of the preferred embodiment of FIG. 7 from the view of line 8—8.

FIG. 9 is a side view of a fifth preferred embodiment of the present invention, wherein the handle portions are outwardly curved.

FIG. 10 is a rear view of a bias means for urging closure of the jaw members of a preferred embodiment.

DESCRIPTION OF THE PREFERRED EMBODIMENTS

Figure 11:
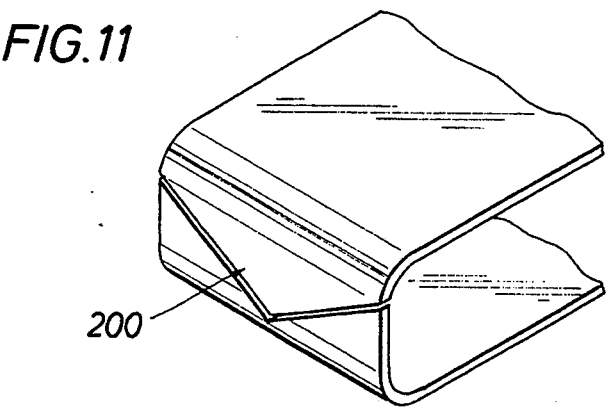
FIG. 11 is an end view of a sixth preferred embodiment.

Now referring to the drawings, and first to FIG. 1, an appliance 10, such as a hand-held hair dryer, is shown having an elongated flexible electrical cord 12 attached thereto for plugging into a suitable electrical outlet (not shown). When the appliance is not in use, the cord is looped, folded or otherwise gathered in multiple thicknesses. Because such thicknesses, even when tidy to begin with, tend to separate and spread apart and become untidy because of their resiliency when tightly gathered, a clasp 14 in accordance with the present invention is enclosed about them to retain them in their tidy condition.

A first preferred embodiment of a clasp 14 is shown in FIG. 2. The clasp generally comprises two main parts, namely, first elongated jaw member 16 and second elongated jaw member 18. Typically, jaw members 16 and 18 are configured in plastic, moldable hard rubber or the like in suitable complementary molds in a manner well known in the art. Jaw member 16 is in one piece, but can be considered as comprising cord surrounding portion 20 and handle portion 22. Similarly, jaw member 18 comprises cord surrounding portion 24 and handle portion 26. As shown in FIG. 2, this embodiment has a long, low profile.

Cord surrounding portion 20 and handle portion 22 converge together at internal pivot ridge 28 and cord surrounding portion 24 and handle portion 26 converge together at cooperatively contacting facing pivot ridge 30. A biasing means in the form of a coil spring 32 with suitable lap-over ends in the external surface valleys opposite the internal surface ridges hold the jaw members together. A suitable dog 31 attached to ridge 30 and operating through a hole in ridge 28 can be provided as further security in holding together members 16 and 18. When handles 22 and 26 are squeezed together, cord surrounding portions 20 and 24 separate so that the gathered cord to be clasped or held can be inserted.

Cord surrounding portions 20 and 24 have complementary curvilinear surfaces. However, as noted, the front edge of portion 20 includes a gently pointed tip 34 to one side, which tip can curve more or be more rounded than the remainder of its shape. In like fashion, the front edge of portion 24 includes a gently pointed tip 36 to its side opposite that of tip 34. Also in similar fashion, the surface of portion 24 in the vicinity of tip 36 can be more rounded or curved than the remainder of its surface. It should be noted that since the tips are on a greater arc portion of their respective curves than the remainders of their front edges, it is the tips that provide the initial in-gathering of the cord thicknesses. The tips also ensure that the cord loops are held within the grasp of the clasp more efficiently than if the front edges of portions 20 and 24 had been straight across and with no exaggerated curves, as may be seen from FIG. 4.

As noted above, the shapes of portions 20 and 24 are complementary to provide clasping of cord 12 within its grasp. Most conveniently, portions 20 and 24 can be identically shaped and can even be made from the same mold, if desired. To make the parts identically as shown in FIG. 2, top member 16 is subsequently stamped to form a hole and to remove the dog 31 that was molded in place.

Now referring to FIG. 5, an oblique view of a cord clasp 46 is shown that is similar to cord clasp 16; however, clasp 46 is generally shorter and rounder in profile. This is because cord surrounding portions 50 and 54 of the respective jaw members have a more circular profile that encourages the loops of cord being gathered to roll into the grasp of the jaw members as the handles of the clasp are operated. Again, the two parts are complementary and include tips 64 and 66 (hidden in the side view shown), tip 64 being on one side of jaw member 50 and tip 66 being on the other side of jaw member 54. The two jaw members can be held and biased closed together by a spring such as spring 32 or other equivalent means such as spring 33 that has only one end that extends to overlap member 50. It should be noted that the forward edges do not have to completely shut to encompass the cord loops, although if there are only a few loops, the two edges will come together, at least at one point. Note further that the clasp can conveniently be made from a resilient plastic or metal structure, such as by stamping, if preferred. In such case a dog 35 is made from stamping out a portion of the material in the lower ridge. A hole to accommodate dog 35 is stamped in the upper ridge.

Referring to FIGS. 2 and 5, it will be seen that both clasps are quite broad so as to embrace or enclose a significant portion of each loop. Preferably the width of a clasp is a minimum of 1 inch wide and can be 2 inches wide or greater. For the FIG. 5 embodiment, the width of the cord surrounding portion is substantially as wide as this portion is long.

FIG. 6 shows yet a third embodiment of a suitable clasp in accordance with this invention. In this case the shape is similar to the clasp shown in FIG. 5; however, the clasp is made of resilient metal, such as aluminum or steel. The two jaw members in this case are held together at the ridges by dog 70 in the same or similar manner to that described for FIG. 5 so as to permit pivoting action to occur. A segment 80 is formed by a cutting or stamping action to form a leaf spring depending from handle 84 of the upper jaw member. End 81 of segment 80 is bent over and passed through hole 83 in the lower cord surrounding or jaw member of the clasp to bias the clasp shut when the handles are released. Alternatively, a separate leaf spring can be attached to one handle and bent to contact the other in similar fashion.

FIG. 7 shows a fourth preferred embodiment of the present invention. The embodiment shown has a first elongated jaw member 90 and a second elongated jaw member 92. Jaw member 90 can be considered as comprising cord surrounding portion 94 and handle portion 96. Jaw member 92 can be considered as comprising cord surrounding portion 98 and handle portion 100. Handle portions 96 and 100 have one or more ridges 102 for gripping the handles with fingers or knuckles when opening the clasp. The ridges will be approximately ⅛ inch wide and approximately 1/32 inch in height. The ridges will be spaced approximately ¼ inch to ⅜ inch apart.

The cord clasp is shown in the open position in FIG. 7, wherein the jaw members are parallel to one another. When the clasp is closed, it will have a tapered profile such that handle portions 96 and 100 are farther apart than are cord surrounding portions 94 and 98. As shown in FIG. 8, the jaw members fan out slightly in width from the handle portions to the front edges.

Referring to FIG. 9, a fifth preferred embodiment of the present invention is shown. The clasp shown has a first elongated jaw member 120 and a second elongated jaw member 122. Jaw member 120 is in one piece, but it can be considered as comprising cord surrounding portion 124 and handle portion 126. Similarly, jaw member 122 comprises cord surrounding portion 128 and handle portion 130. As discussed with respect to FIG. 7, the clasp has a tapered profile wherein the clasp is narrowest where cord surrounding portions 124 and 128 converge. The clasp is widest in profile at handle portions 126 and 130.

Handle portions 96 and 100 curve out at approximately 45° at the end. The curved area of the handle portions accommodate finger tips or knuckles for squeezing the handle portions 126 and 130 together to open the clasp. When the handle portions are squeezed together, cord surrounding portions 124 and 128 separate so that the gathered cord to be clasped or held can be inserted. The handle portions will be parallel to each other when the cord clasp is in the open position.

The clasp is narrower in profile where the surrounding portions converge to enable snugly securing a small number of loops of cord. The wider profiled area of the cord surrounding portions enable snugly securing a larger bundle of cord loops. The narrower end of the clasp may range from a height of ¼ inch to 1½ inch. When the clasp is closed, the narrow end of the clasp will be ¼ inch in height. As handle ends 126 and 130 are squeezed, cord surrounding portions 124 and 128 will separate up to approximately 1½ inch, or approximately the height of the pivot point. When a small number of cord loops need to be secured, the clasp is opened, the cord loops inserted and positioned at the narrow end of the clasp. When the clasp is closed, the small number of cord loops are held securely in place at the narrow end of the clasp. If a large number of cord loops need to be secured, the wider end of the clasp may be utilized to accommodate the cord.

As shown in FIG. 10, a biasing means in the form of a first hinge 103a and a second hinge 103b hold the jaw members together. Hinge 103a comprises a first arm 104a and a second arm 106a. Hinge 103b comprises a first arm 104b and a second arm 106b. Shaft 108 is pressed fit through both hinges and holds spring 110 in place between the hinges. Spring 110 has a first leg 112 and a second leg 114, which contact jaw members 90 and 92, respectively. The legs of the spring urge the clasp closed. The hinges will be located approximately ⅜ inch from the end of the handle portions to permit pivoting action to occur. The pivot point will be approximately 1½ inch in height.

Figure 12:
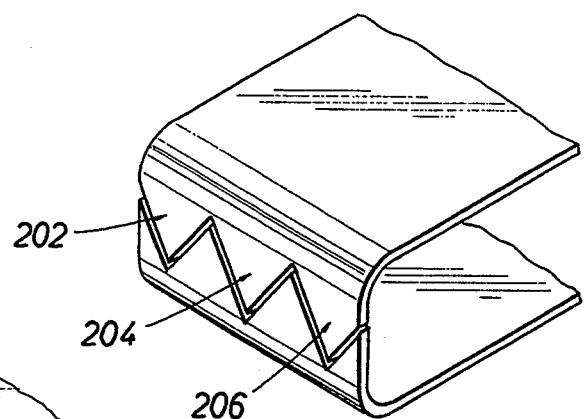
FIG. 12 is an end view of a seventh preferred embodiment.
Figure 13:
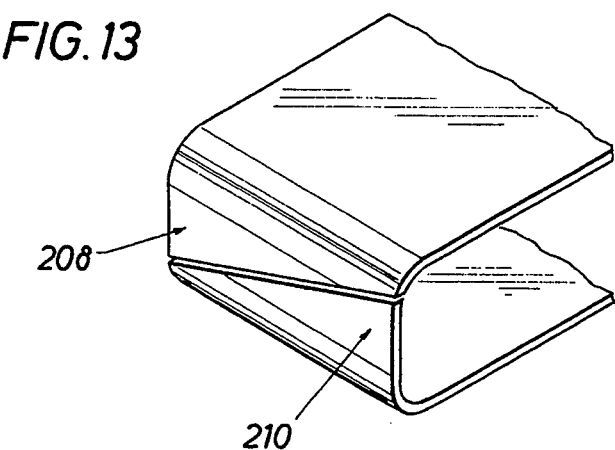
FIG. 13 is an end view of an eighth preferred embodiment.
Figure 14:
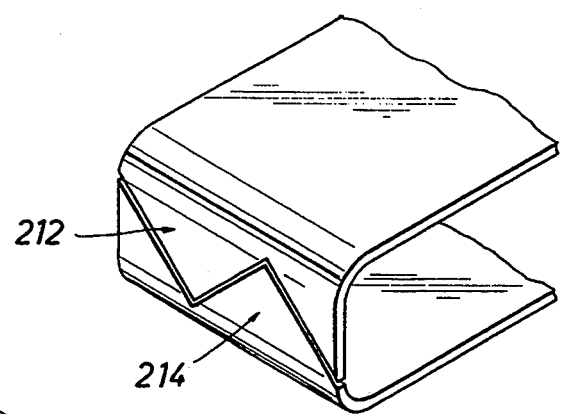
FIG. 14 is an end view of a ninth preferred embodiment.
Figure 15:
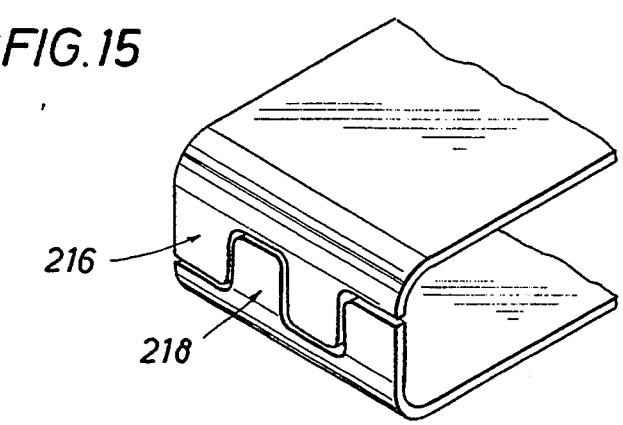
FIG. 15 is an end view of a tenth preferred embodiment.

Cord surrounding portions shown in FIGS. 7 and 9 have complementary shaped surfaces. Additional alternative shaped surfaces are shown in FIGS. 11 through 15. The front edges of the cord surrounding portions are complementary shaped such that the front edge of the lower cord surrounding portion and the front edge of the upper cord surrounding portion may be closedly engaged. The front edge of an upper cord surrounding portion may be shaped to resemble one or more shark's teeth. FIG. 11 shows the front ends having a single shark tooth 200 shape. FIG. 12 shows the front edges having a plurality of shark's teeth 202, 204, and 206. The forward edges of the jaw members may be angled at opposite sides to respective first pointed tip 208 and second pointed tip 210, as shown in FIG. 13. FIG. 14 shows a preferred embodiment of the present invention having a first jagged edge 212 and a second jagged edge 214. FIG. 15 shows the front edges of a preferred embodiment having a plurality of complementary-shaped rounded tips 216 and 218, however, a singular complementary-shaped rounded tip may be used. All the shaped surfaces shown in FIGS. 11 through 15 enable the clasp to continue to hold the cord in place even when the cord surrounding portions are not closedly engaged. Although the described embodiments have complementary-shaped surfaces, not all embodiments comprise surfaces which are mirror images of one another.

The clasp shown in FIG. 7 can be made by fabricating individual handle-and-jaw-member segments. A separate mold is created for a segment of the elongated jaw member having two segments of predetermined size for surrounding the gathered cord. A second mold is created for a segment of a two segment handle portion having a plurality of transverse ridges. One of the transverse ridges is located at the forward end of the segment of the handle portion that adjoins the segment of the jaw member. The elongated jaw member mold and the handle portion mold are joined to form a common mold. The handle-and-jaw-member segment is molded in the joined molds in one fill with solidifying plastic material. The line on the molded segment where the jaw member mold and the handle portion mold are joined is hidden at the trough of the transverse ridge on the forward end of the segment of the handle portion. Clasps having various segment lengths for surrounding the gathered cord can be made by joining the mold for the handle portion described with jaw member segment molds of varying lengths. It is unnecessary to have molds of handles of different dimensions since the gripping requirements of the handle do not change with the length of the jaw member segments.

The clasps shown are quite broad so as to embrace or enclose a significant portion of each cord loop. Preferably the clasp will be at least 1 inch wide, and can be up to 4 inches wide or greater. The clasps of FIGS. 7, 9, and 11 through 15, may be made of any of the materials discussed previously herein.

While several preferred embodiments of the invention have been described and illustrated, it will be understood that the invention is not limited thereto, since many modifications may be made and will become apparent to those skilled in the art. For example, other suitable pivots or hinges can be used for connecting together the jaw members. Moreover, other bias means for urging the jaw members together can also be employed, if desired.

What is claimed is:

1. A clasp for holding together multiple thicknesses of gathered cord, comprising
   a first elongated jaw member having a cord surrounding portion and a handle portion having a plurality of transverse ridges,
   a second elongated jaw member having a cord surrounding portion and a handle portion having a plurality of transverse ridges, said second jaw member being pivoted with respect to said first jaw member so that said first jaw member cord surrounding portion and said second jaw member cord surrounding portion are juxtapositioned to open away from one another when said handle portions are squeezed together,
   bias means secured to said first jaw member and said second jaw member to urge closure of said cord surrounding portion of said jaw member with said cord surrounding portion of said second jaw member, said first jaw member and said second jaw member being farther apart at said handle portions than at said cord surrounding portions when the clasp is closed and
   said cord surrounding portions of said first and second jaw members having respectively complementary curvilinear front edges for retaining the gathered cord within said surrounding portions even when not fully closed.

2. A clasp for holding together multiple thicknesses of gathered cord, comprising
   a first elongated jaw member having a cord surrounding portion and a handle portion for accommodating at least one finger,
   a second elongated jaw member having a cord surrounding portion and a handle portion for accommodating a thumb, said second jaw member being pivoted with respect to said first jaw member so that said first jaw member cord surrounding portion and said second jaw member cord surrounding portion are juxtapositioned to open away from one another when said handle portions are squeezed together,
   bias means secured to said first jaw member and said second jaw member to urge closure of said cord surrounding portion of said jaw member with said cord surrounding portion of said second jaw member, said first jaw member and said second jaw member being farther apart at said handle portions than at said cord surrounding portions when the clasp is closed and
   said cord surrounding portions of said first and second jaw members having respectively complementary front edges, at least one of said first and second jaw members having at least one shark-shaped tooth engageable with the edge of the other jaw member when said jaw members close for retaining the gathered cord within said surrounding portions even when not fully closed.

3. A clasp in accordance with claim 2, wherein said respective front edges are complementary shaped on opposite sides to a plurality of jagged tips.

4. A clasp in accordance with claim 2, wherein said bias means includes a first hinge attached to said first jaw member and a second hinge attached to said second jaw members.

5. A clasp in accordance with claim 2, wherein at least one of said first and second jaw members are made of resilient material and said bias means includes at least a portion of said resilient material.

6. A clasp in accordance with claim 2, wherein said first and second jaw members are molded in substantially identical shapes.

7. The clasp in accordance with claim 2, wherein said shark-shaped tooth is sharply pointed.

8. The clasp in accordance with claim 2, wherein said shark-shaped tooth is rounded.

9. The clasp in accordance with claim 2, wherein said shark-shaped tooth is centered on its front edge.

10. The clasp in accordance with claim 2, wherein each of said first and second jaw members include at least one tooth, none of which is centered on its front edge.

11. The clasp in accordance with claim 2, wherein at least one of said shark-shaped teeth is located at an end of its front edge.

12. The clasp in accordance with claim 2, wherein said shark-shaped tooth is angled across its entire front edge.

13. A method for making a clasp for holding together multiple thicknesses of gathered cord, which comprises
    making a first handle-and-jaw-member segment having a cord surrounding portion and a handle portion for accommodating at least one finger;
    making a second handle-and-jaw-member segment having a cord surrounding portion and a handle portion for accommodating a thumb, wherein said cord surrounding portions have respectively complementary front edges, at least one of said front edges having at least one shark-shaped tooth engageable with the edge of the other jaw member when said jaw members close for retaining the gathered cord within said surrounding portions even when not fully closed; and
    joining the first handle-and-jaw-member segment and the second handle-and-jaw-member segment with a bias means such that the first and second handle-and-jaw-member segments are juxtapositioned to mirror-image one another.

14. The method of claim 13, wherein the step of joining the first and second handle-and-jaw-member segments includes attaching a first hinge and a second hinge to the first handle-and-jaw-member segment and the second handle-and-jaw-member segment and fitting a spring means between the first and second hinge.

* * * * *